United States Patent
Hsieh

(10) Patent No.: US 8,255,091 B2
(45) Date of Patent: Aug. 28, 2012

(54) TEMPERATURE CONTROL CIRCUIT

(75) Inventor: Ming-Chih Hsieh, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 223 days.

(21) Appl. No.: 12/755,402

(22) Filed: Apr. 6, 2010

(65) Prior Publication Data

US 2011/0160932 A1 Jun. 30, 2011

(30) Foreign Application Priority Data

Dec. 25, 2009 (TW) ................. 98145199 A

(51) Int. Cl.
*G05D 23/00* (2006.01)
*H05B 1/02* (2006.01)

(52) U.S. Cl. ............... 700/300; 219/494; 219/506

(58) Field of Classification Search .......... 700/276, 700/278, 299, 300; 219/481, 494, 497, 501, 219/504, 505, 506, 507, 508

See application file for complete search history.

(56) References Cited

U.S. PATENT DOCUMENTS

| | | | | |
|---|---|---|---|---|
| 6,080,971 A | * | 6/2000 | Seitz et al. | 219/501 |
| 6,466,024 B1 | * | 10/2002 | Rogers | 324/427 |
| 6,691,923 B2 | * | 2/2004 | Shearer | 219/501 |
| 6,998,584 B1 | * | 2/2006 | Luo | 219/486 |
| 7,006,900 B2 | * | 2/2006 | Zhenduo et al. | 700/299 |
| 8,003,922 B2 | * | 8/2011 | Seger | 219/502 |
| 8,097,835 B2 | * | 1/2012 | Hsieh | 219/494 |
| 2011/0160931 A1 | * | 6/2011 | Hsieh | 700/300 |

* cited by examiner

*Primary Examiner* — Charles Kasenge
(74) *Attorney, Agent, or Firm* — Altis Law Group, Inc.

(57) ABSTRACT

A temperature control circuit includes a microprocessor, a temperature detecting module, and a heating module. The temperature detecting module includes a thermistor and a first switch. The thermistor is operable to sense a temperature to turn on or off the first switch for outputting a detection signal to the microprocessor. The heating module includes a heater and a second switch. The microprocessor controls the second switch to turn on or off for making the heater works or stop working according to the detection signal.

3 Claims, 2 Drawing Sheets

TEMPERATURE CONTROL CIRCUIT

CROSS-REFERENCE TO RELATED APPLICATIONS

Relevant subject matter is disclosed in two co-pending U.S. patent applications (Ser. Nos. 12/755,401, and 12/755,400) filed on the same date and having the same title, which are assigned to the same assignee as this patent application.

BACKGROUND

1. Technical Field

The present disclosure relates to a temperature control circuit.

2. Description of Related Art

When the temperature is within a range from 0 degrees Celsius to 70 degrees, most electronic devices operate properly. However, when the temperature is too low, such as 10 degrees below zero, some electronic devices cannot work properly. Therefore, an effective temperature control circuit is beneficial for control the working temperature for many electronic devices.

DETAILED DESCRIPTION

Figure 1:
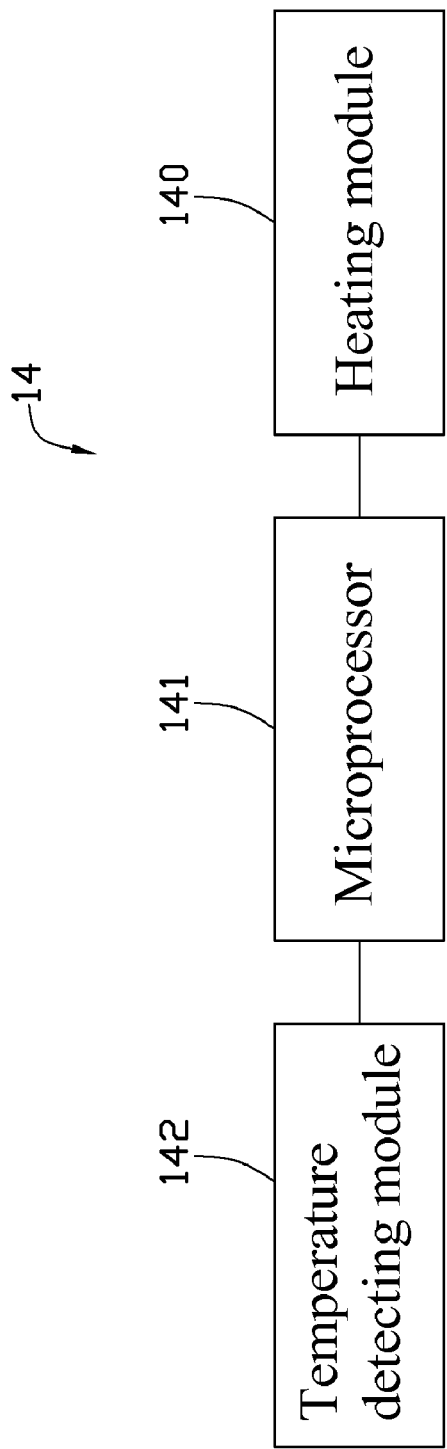
FIG. 1 is a schematic block diagram of an exemplary embodiment of a temperature control circuit.

Referring to FIG. 1, is an exemplary embodiment of a temperature control circuit 14 which is used in an electronic device to make the electronic device operate properly. The temperature control circuit 14 includes a microprocessor 141, a heating module 140, and a temperature detecting module 142. The heating module 140 and the temperature detecting module 142 connect to the microprocessor 141. When the electronic device powers on, the heating module 142 heats the electronic device. When the electronic device is at work, the temperature detecting module 142 detects the temperature of the electronic device, and outputs a detection signal to the microprocessor 141. The microprocessor 141 controls the heating module 140 to work or not to work according to the detection signal.

Figure 2:
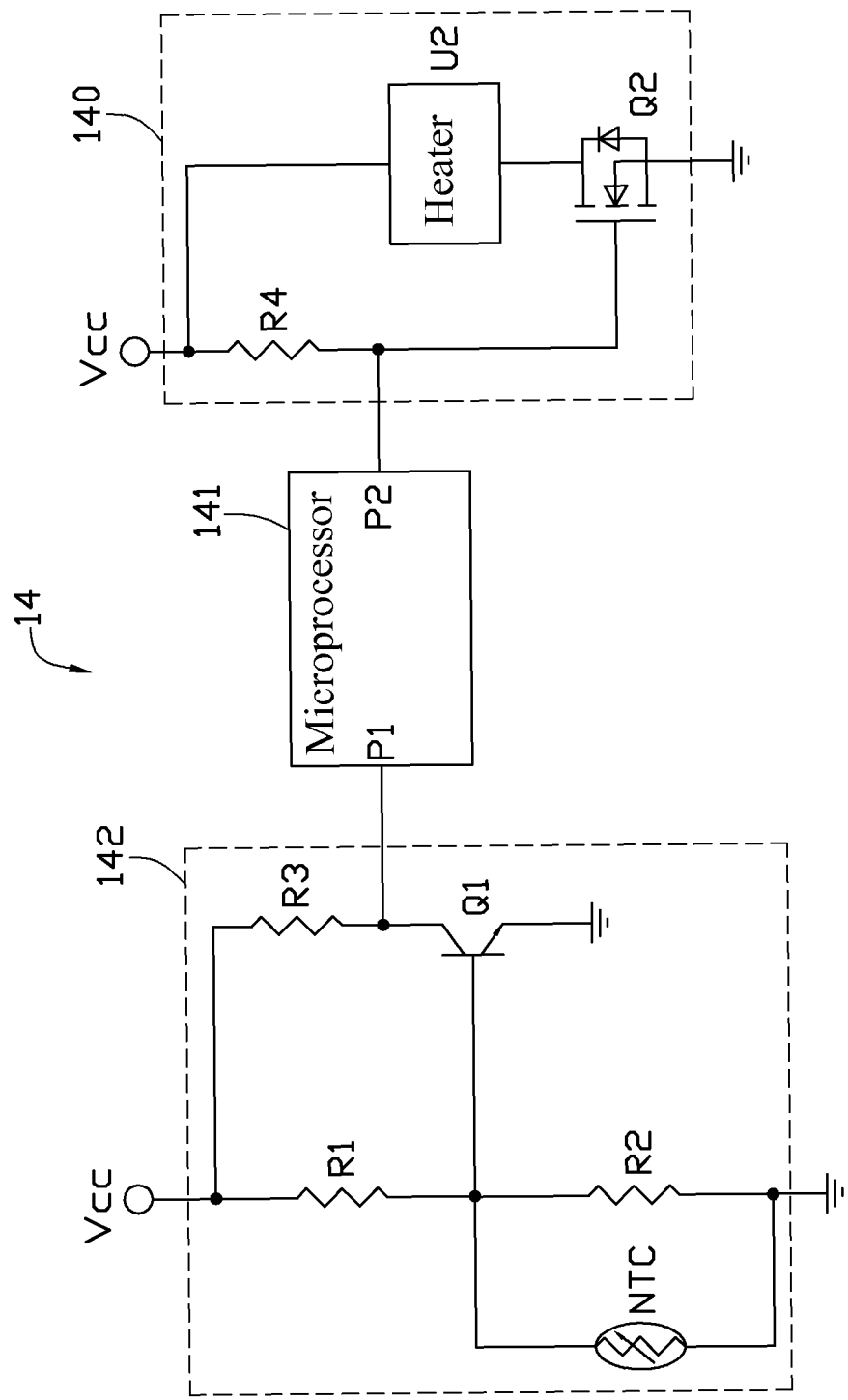
FIG. 2 is a circuit diagram of the temperature control circuit in FIG. 1.

Referring to FIG. 2, the temperature detecting module 142 includes a thermistor and a transistor Q1. The heating module 140 includes a Metal-Oxide-Semiconductor Field-Effect Transistor (MOSFET) Q2 and a heater U2. In this embodiment, the thermistor is a negative temperature coefficient thermistor NTC. The heater U2 is a positive temperature coefficient heater. The heater U2 and the MOSFET Q2 are contrived to operate properly when the temperature is too low, such as 30 degrees below zero.

A base of the transistor Q1 connects to a power source Vcc via a resistor R1. The base of the transistor Q1 grounds via a resistor R2. The resistor R2 connects to the thermistor NTC in parallel. A collector of the transistor Q1 connects to the power source Vcc via a resistor R3. The collector of the transistor Q1 further connects to an input P1 of the microprocessor 141 directly. An emitter of the transistor Q1 goes to ground.

A gate of the MOSFET Q2 connects to an output P2 of the microprocessor 141, and connects to the power source Vcc via a resistor R4. A drain of the MOSFET Q2 connects to the power source Vcc via the heater U2. A source of the MOSFET Q2 goes to ground.

If the working temperature range of the electronic device is within 0 degrees to 70 degrees within which the electronic device operates properly and when the electronic device powers on in a temperature below zero, the temperature control circuit will operate. At this moment, the output P2 of the microprocessor 141 increases to a high voltage level via the power source Vcc and the resistor R4. The MOSFET Q2 turns on. As a result, the heater U2 starts to work to increase the temperature of the electronic device.

When the temperature of the electronic device reaches an operating temperature, such as 0 degrees, the microprocessor 141 starts to work, and makes the electronic device operate properly. At this moment, a resistance of the thermistor NTC is large. As a result, a voltage on the thermistor NTC is at a high level. The transistor Q1 turns on. The input P1 of the microprocessor 141 is at a low voltage level. Therefore the output P2 of the microprocessor 141 outputs a high level signal to make the heater U2 heat continuously.

When the temperature of the electronic device reaches a threshold value, such as 30 degrees, the resistance of the thermistor NTC is low. As a result, a voltage on the thermistor NTC is at a low level. The transistor Q1 turns off. The input P1 of the microprocessor 141 is at a high voltage level. Therefore, the output P2 of the microprocessor 141 is at a low voltage level to turn off the heater U2.

After the heater U2 stops working, if the temperature of the electronic device is under the threshold value, the transistor Q1 turns on. As a result, the heater U2 starts to work again. In this way, the electronic device can keep on operating properly.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A temperature control circuit used in an electronic device, the temperature control circuit comprising:

a microprocessor;

a temperature detecting module comprising a thermistor and a transistor, wherein a base of the transistor grounds via the thermistor, and connects to a power source via a first resistor, a collector of the transistor connects to the power source via a second resistor, and connects to an input of the microprocessor, an emitter of the transistor grounds, and the thermistor is operable to sense a temperature of the electronic device to turn on or off the transistor for outputting a detection signal to the microprocessor; and a heating module comprising a heater and a metal-oxide-semiconductor field-effect transistor (MOSFET), wherein a gate of the MOSFET connects to the power source via a third resistor, and connects to an output of the microprocessor, a drain of the MOSFET connects to the power source via the heater, a source of the MOSFET grounds, and the microprocessor controls the MOSFET to be turned on or off for supplying power to the heater to activate the heater or not supplying power to the heater to deactivate the heater according to the detection signal.

2. The temperature control circuit of claim 1, wherein the thermistor connects to a fourth resistor in parallel.

3. The temperature control circuit of claim 1, wherein the thermistor is a negative temperature coefficient thermistor.

* * * * *